United States Patent [19]

Ueda

[11] 3,805,263

[45] Apr. 16, 1974

[54] SYSTEM FOR DETECTING AN OBJECT

[76] Inventor: Takeo Ueda, 1701 Hiyoshihoncho, Kohuku-ku, Yokohama-shi, Kanagawa-ken, Japan

[22] Filed: Aug. 15, 1972

[21] Appl. No.: 280,830

[52] U.S. Cl. ............................. 343/5 PD, 343/7.7
[51] Int. Cl. ............................................. G01s 9/42
[58] Field of Search ..................... 343/5 PD, 7.7

[56] References Cited
UNITED STATES PATENTS

| | | | |
|---|---|---|---|
| 3,126,539 | 3/1964 | Mulvey | 343/7.7 |
| 2,548,813 | 4/1951 | Perkins et al. | 343/6.8 R |
| 3,383,682 | 5/1968 | Stephens, Jr. | 343/7.7 |

FOREIGN PATENTS OR APPLICATIONS

| 656,399 | 8/1951 | France | 343/5 PD |
|---|---|---|---|

*Primary Examiner*—Malcolm F. Hubler
*Attorney, Agent, or Firm*—Price, Heneveld, Huizenga & Cooper

[57] ABSTRACT

A detecting system including a low power UHF oscillator circuit. The oscillator is adjusted to a high impedance, and coupled to an antenna for radiating an extremely weak level signal therefrom. Signals reradiated from a moving body are received by the antenna and change the oscillator frequency which is sensed to develop a control signal. The oscillator design provides a very high sensitivity detector in a simple and inexpensive circuit to reduce cost and power consumption.

7 Claims, 7 Drawing Figures

SYSTEM FOR DETECTING AN OBJECT

BACKGROUND OF THE INVENTION

This invention relates to an electrical system which detects an approaching body, i.e., pedestrian, motor vehicle, etc., on a definite point and distance, and sends a signal corresponding thereto.

This invention can be utilized not only for the prevention of rear-end collision of motor vehicles, automation of parking yards, burglar alarms, etc., but also for the detection of conditions in the automatic control of continuous manufacturing processes. In many cases, its characteristics would be suitable for various specific applications.

In detecting a moving body, capacity-type and wave reflective detectors, etc., have been used. In relation to the former, the capacity between the detected body and the detection electrode is remarkably small; and the change in this capacity due to the movement of the body is even smaller, even at close range. Consequently, the detection sensitivity is relatively low. In relation to rolling stock, the capacity of a vehicle's body is not constant and varies according to the difference in the weight of load, difference in the profile of the vehicle and etc. The reliability of performance of prior capacity detecting systems has been relatively low.

As for the latter, the surge absorption factor in the reflection point and in the air is so large that the received wave is weak. In this connection, precision expensive systems would be required for adequate performance for many applications. On the other hand, being affected by atmosphere conditions, etc., and because of its characteristics, frequently large errors result in the detection value.

In the iron industry, where physical contact with heated metal is practically impossible, and the semifinished goods are hot and luminous, sonic or light detectors cannot generally be used.

SUMMARY OF THE PRESENT INVENTION

Systems of this invention use UHF (for example, 680 MHz) electromagnetic radiation. A very weak wave is emitted from a short antenna, at the required directivity. The change in the antenna impedance due to the approach of the detected body affects the oscillation circuit feeding the antenna and set at a high impedance. The subsequent variation in the oscillation circuit is extracted as a control signal indicating the approach of a body. The oscillation circuit is placed in a weak oscillating condition unlike normally operated oscillators to achieve the desired detection sensitivity.

An instance in which the actual values were measured for the detection of pedestrians and the braking operation, when this device was set in a motor vehicle travelling at a low speed was as follows: When the detection range for the object was set at 2.5 – 4 m. so as to give the alarm at a detected distance of 4 m., and the brake was operated by the alarm; the remaining distance to the pedestrian at the stop of motor vehicle was 1.5 m.

In applying this device to motor vehicles, etc., it is preferable that the alarm should not be actuated by pedestrians at the side of the motor vehicle, or opposition vehicles approaching in their normal lane. In relation to the vehicle width side line, therefore, the directivity of antenna must be properly selected.

Radar is most commonly used as a detector of airplanes. In relation to its use of the Doppler effect, etc., it is pointed out that this invention does not employ such an effect as will be explained in detail below.

It is an object of this invention to provide a detector for a moving body where said detector can be used for long periods of time because of small power consumption, and which is remarkably high in detection sensitivity.

It is another object of this invention to provide a detection circuit of high sensitivity in which a constant current feed system is employed for the oscillation circuit, and the variation of circuit by the approach of the detected body is many times greater than that of conventional systems.

It is still a further object of this invention to provide the composition of a low cost detection circuit in which the length of the inductive element of the oscillator is small because of the UHF frequency and further shortened by means of connection to a variable condenser for the L reduction, and which is etched on the print plate.

It is another object of this invention to provide a detector of wide use, in which a discrete variable condenser for changing the oscillation frequency is positioned on the etched parallel inductor of the oscillation circuit to make it possible to change the frequency as much as approximately 20 – 30 percent of the fundamental frequency. The detection signal of the object is adjusted for a non-zero reading when the detected object is positioned between the detector antenna and the point where the emitted wave crosses the zero axis.

Further objects, features and advantages of this invention will become apparent from a consideration of the following description, the appended claims and the accompanying drawings in which:

DETAILED DESCRIPTION OF THE PREFERRED EMBODIMENT

Figure 1:
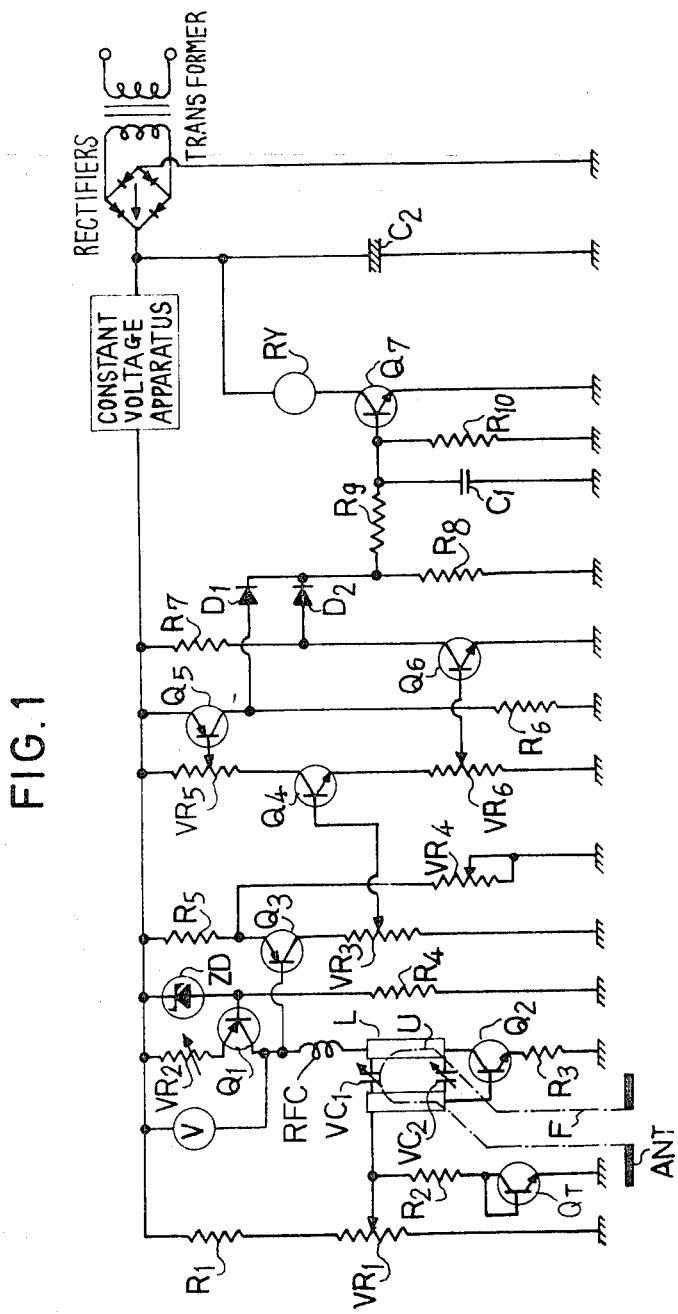
FIG. 1 is an electrical circuit diagram in schematic form of the detector of this invention.

In FIG. 1, the UHF oscillator consists of a distributed constant circuit formed by the inductor L parallel to capacitor $VC_1$. $VC_1$ is a variable condenser for reducing the physical length of the etched inductor L. $VC_2$ is also a variable condenser for changing the oscillation frequency.

Resistance $R_1$ and $VR_1$ are resistances, which bias to the oscillator transistor $Q_2$. Resistor $R_2$ and transistor $Q_T$ provide temperature compensation for $Q_2$ by varying the bias with temperature variations. Resistance $R_3$ is connected to the emitter side of transistor $Q_2$ to ground. Radio frequency coil RFC, transistor $Q_1$ and resistance $VR_2$ are connected to the collector side. In oscillating at an ultra high frequency, variable condensers, $VC_1$ and $VC_2$ are first set to zero. Resistor $VR_1$ is gradually varied to increase the voltage imposed upon the base of transistor $Q_2$ to initiate the current flow.

ZD is a constant voltage zener diode of approximately 3V. Resistance value $R_4$ is so set as to stabilize the above diode, which works in the linear portion of the characteristics. At the base of transistor $Q_1$, therefore, a voltage of 3V is impressed. Thus a constant current feed system for oscillator transistor $Q_2$ is formed.

Resistance $VR_2$ is set at a proper value (less than 1KL), and resistance $VR_1$ is so adjusted that the reading of voltmeter V is in the range of 0.5 – 0.8 V. Then the variable condenser $VC_1$ is gradually adjusted providing positive feedback and increasing the current of transistor $Q_2$ to begin oscillation of the circuit.

When the variable condenser $VC_1$ is turned on until the reading of voltmeter V becomes approximately 3V., the desired oscillation condition is completed. Electromagnetic energy is radiated from a half wave dipole antenna ANT by way of hairpin shaped coupling coil U and feeder line F. Transistor $Q_1$ and resistance $VR_2$ feeds the constant current to the oscillator by way of twin diode ZD. When the reading of voltmeter V is 3V, $I_0$ (FIG. 2) shows the current of transistor $Q_2$ and $f_0$ its corresponding frequency. The detection process of this system is now described.

When a body enters the radiation zone of the emitted radio wave, the phase of the antenna current changes by virtue of re-radiation from the body. The antenna current and oscillator subsequently changes and these variations are employed as the control signal from the detector. When the phase of antenna current is out of order, a change to $f_1$ or $f_2$ in the oscillation frequency changes the collector current of transistor $Q_2$ to $I_1$ or $I_2$. In order to make such an effect at high sensitivity, it is necessary that the oscillator has a high impedance and that the radiated current value is small.

Figure 4:
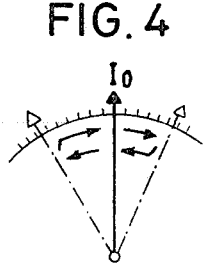
FIG. 4 is an illustration of the movement of the meter pointer.
Figure 3:
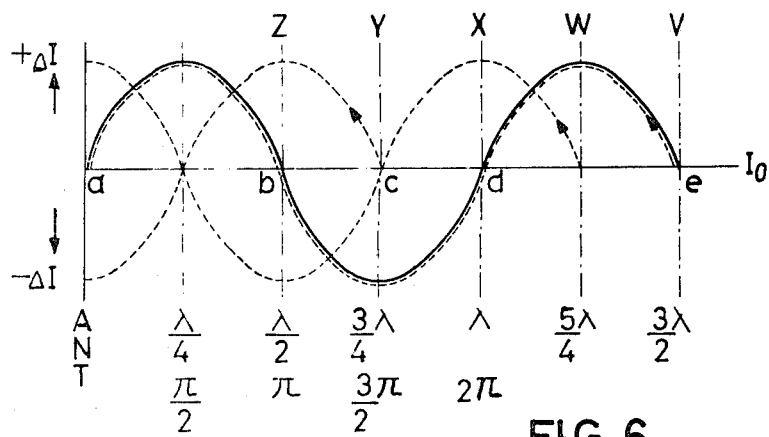
FIG. 3 is a diagram of comparison between the radiation wave from the antenna and the re-radiation wave by the detected body.

FIG. 3 shows that the magnitude of collector current (for $Q_2$) of this device does not change every half wave length ($\lambda/2$) as shown in $a - e$. This can be observed in the movement of the needle of an ammeter such as shown in FIG. 4. If it is assumed that the indication value is $I_0$, when the detected body is out of range, the needle moves from its position, when the body approaches. As illustrated, however, the needle firstly goes up indicating increased collector current. When the body further approaches, the collector current returns, and passes the $I_0$ point. When the body further moves, the needle once again goes up and returns. Thus, one cycle is finished. The lateral division of the axis of abscissa in FIG. 3 is expressed in forms of wavelength $\lambda$ and electrical angle $\pi$. Variation for each division is $I_0 + \Delta I$ for $V \rightarrow W(3/2\lambda - 5/4\lambda)$, $(I_0 + \Delta I) - \Delta I$ for $W \rightarrow X(5/4\lambda - \lambda)$, $I_0 - \Delta I$ for $X \rightarrow Y(\lambda - 3/4\lambda)$, and $(I_0 - \Delta I) + \Delta I$ for $Y \rightarrow Z(3/4\lambda - 1/2\lambda)$.

In this device, the signal does not go out as the frequency lag, i.e., beat, but as the change in direct current, when the detected body approaches the electric field of the detector. In principle, this device is characterized by the movement of the oscillator at a high impedance so as to cause a change in current by means of phase difference due to the re-radiation.

Figure 6:
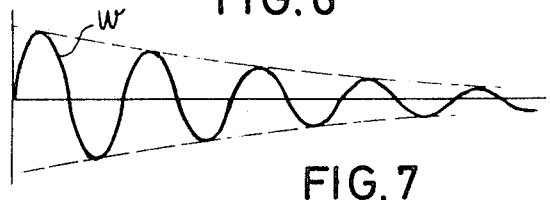
FIG. 6 is a chart showing the attenuation curve of an electromagnetic wave.

The description of FIGS. 1 and 3 shall be hereunder supplemented: The waveform shown in solid lines is the wave radiated from the antenna. The waveform in dotted lines is due to the re-radiation of the detected body. In practice, as shown in FIG. 6, wave strength attenuates with the distance. In FIG. 3, however, it is shown in the non-attenuation status for convenience of description.

As shown in FIG. 3, the phase at the wave radiation, and returning phase form a cycle at electrical angle, 0° – 90°, 90° – 180°, 180° – 270° and 270° – 360°, when the body approaches or retreats. On the antenna, antenna current is offset so much as the returning attenuation waveform. If the detected body moves, therefore, the same effect is obtained as in case when the radiation impedance Za of antenna makes a change. If the voltage $e$ is constant, when $I = e/Za$, current I would naturally change, if the radiation impedance Za changes.

In this device, the current of the parallel or coaxial oscillator is extremely weak. If the inner impedance of the device is calculated, it would be too low if the supply voltage were less than 6 V. If it is assumed that the voltage is approximately 9 – 24 V, and the current $I_0$ is 3mA, Zo=9V/3mA=3KΩ, when the power voltage Vcc = 9V, Zo = 24V/3mA = 8KΩ, when Vcc = 24V.

Considering the DC, current, no more than 0.5 – 0.8 mA flows at the resistance $VR_1$. Therefore, the impedance is:

$Z_{DC} = 9V/0.5mA = 18KΩ$, or
$Z_{DC} = 24V/0.5mA = 48KΩ$

The radiation wave attenuates and returns to the antenna. The re-radiated wave depends upon the type (i.e., metallic or dielectric) or size of the detected body. Between the metal and dielectric bodies, there is a difference, approximately 180° in the phase of detection current. With the resistivity of the detected body, the strength of the re-radiation wave also changes. In this connection, some difference is noticed in the detection distance.

As mentioned above, it is indispensable that the UHF oscillator for use in detection has a high impedance. When an oscillator of high impedance is designed, it is preferable to put the negative feedback resistance $R_3$ into the high Q resonant circuit, and set the current midway in the resonance curve of the oscillator, because the detection distance is short. Although the sensitivity would be higher, when the resistance $R_3$ is as small as possible, if it is too small, adjustment of the oscillator would be difficult.

Figure 2:
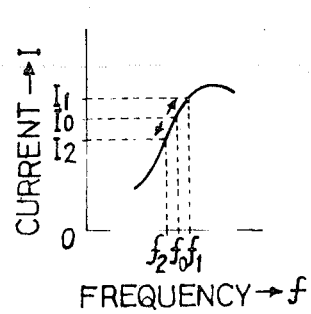
FIG. 2 is a resonance curve diagram of the oscillator.

The above current setting point is at the point $f_0$ of resonance curve of FIG. 2. With the movement of detected body, this point moves in the directions indicated by the arrows. As the change in the load current affects the resonance frequency, too, a large current change can be extracted as signals. When a parallel LC resonance circuit is employed as the resonance circuit, the above phenomenon becomes more remarkable, and the current change and output signal becomes very large.

Resistance $R_2$ and the connecting transistor $Q_T$ are used for temperature compensation. When the collector current $I_c$ of the transistor $Q_2$ increases with the rise of temperature, and the voltage of the resistance $R_3$ increases, the value of the internal resistance between the collector and the emitter of $Q_T$ drops. This affects the bias of transistor $Q_2$ to prevent the increase of collector current and subsequently the current change due to the temperature increase. In case of the temperature decrease, however, performance is reverse. In relation to the temperature change, therefore, current value of the transistor $Q_2$ can be kept constant.

When the constant current is fed to the oscillator by means of transistor $Q_1$, and the phase difference due to the detected body makes a change, a sudden change of the voltage applied to the base of transistor $Q_3$ takes place. With no detected body, the 3V on the base of $Q_3$ had been cancelled by the resistance $R_5$ and $VR_4$ which biases transistor $Q_3$ normally off. As the base voltage of transistor $Q_3$ changes a $\beta$-fold collector current change varies the voltage at the top on resistor $VR_3$.

Figure 5:
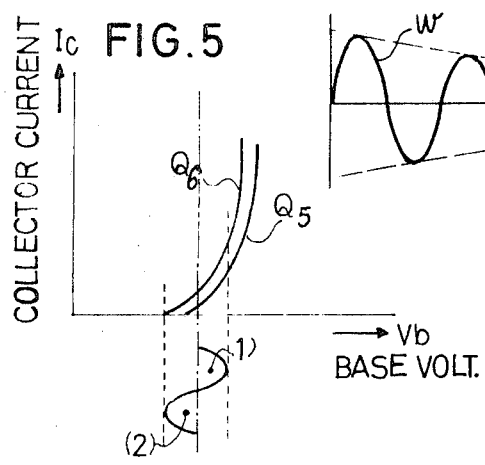
FIG. 5 is a diagram showing the performance characteristics of transistors $Q_5$ and $Q_6$ in FIG. 1.

This large voltage change is applied to transistor $Q_4$, and fed to the transistors $Q_5$ and $Q_6$ by way of resistance $VR_5$ and $VR_6$. Current flows from the transistor $Q_5$ to the resistance $R_8$ by way of diode $D_1$ at the time when the waveform of FIG. 5 is (1). The working point of transistors $Q_5$ and $Q_6$ is on the extended dashed vertical line of the characteristic. Resistance $R_6$ is set at the high level and draws little collector current from $Q_5$.

At this time, transistor $Q_6$ is on, and the large current flows to the resistance $R_7$. As the diode $D_2$ is grounded by $Q_6$, no current flows therethrough.

When the waveform is at the time point of (2), transistor $Q_5$ is switched off. Since the anode of diode $D_1$ is now at ground, no current flows through the $D_1$. Transistor $Q_6$ is also switched off, and current flows through diode $D_2$ to the resistance $R_8$ through the resistance $R_7$. The value of resistance $R_7$ is selected to prevent damage to transistor $Q_6$.

When the control signal thus developed by the system across resistance $R_8$, it is divided in the resistance $R_9$ and $R_{10}$ and applied to drive transistor $Q_7$. When the transistor $Q_7$ is thus switched on, relay $R_y$ is operated and can be employed to actuate a variety of desired items to be controlled; for example, alarms, brakes, and etc.

Figure 7:
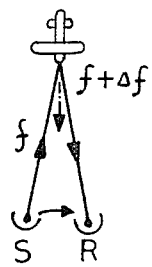
FIG. 7 is an illustration of Doppler radar.

To show that this invention is different from a Doppler radar in principle, formulas for the radar, together with FIG. 7, shall be shown hereunder; If the airplane velocity is V, wave velocity C, transmitting frequency $f$, wavelength $\lambda$, and the period $T$, $T = 1/f$, $\lambda = CT$
$$\therefore C = \lambda/T = \lambda/1/f = f\lambda$$
or $\lambda = C/f$
If the frequency of the wave received by airplane is $f'$, $$f' = C \pm V/\lambda = (C \pm V)/C/f = f(1 \pm V/C)$$

If the frequency sensitive to the Radar is $f_R$, therefore, $$f_R = f'(1 + V/C) = f(1 + V/C)^2 = f(1 + 2V/C + V^2/C^2)$$

As the $V^2/C^2$ is a very small value in the above formula, it can be omitted.
Therefore, $$f_R = f(1 + 2V/C) \therefore \Delta f = 2V/C$$

When there exists relative motion, the $\Delta f$ component comes out. When, however, $V = 0$, $\Delta f$ does not come out and the Doppler principle radar system provides no additional information. With the present system, once an object has moved into the detection range of the system and then becomes stationary, the object will still be detected.

It is possible to actuate relay $R_y$ after one step of amplification subsequent to transistor $Q_3$. In such case, however, only half wave rectification is employed, and the output of the signals becomes half as much as possible when fully utilizing transistor $Q_4$. In short, the amplification circuit can be changed along the objectives of this invention. Also, the system can employ two detectors thereby removing the non-signal points shown in FIG. 3.

These and other variations of the preferred embodiment will become apparent to those skilled in the art but will fall within the scope and spirit of the present invention as defined in the present claims.

The embodiments of the invention in which an exclusive property or privilege is claimed are defined as follows.

1. A system for detecting an object comprising:
   an antenna for radiating electromagnetic energy and for receiving reflected energy from an object;
   means coupling said antenna to a UHF oscillator adjusted for a high output impedance;
   means for supplying electrical energy to said oscillator, said means being adjustable to bring said oscillator into oscillation such that reflected energy from an object varies the radiation impedance coupled to said oscillator from said antenna; and
   detection means direct current coupled to said oscillator and responsive to signals developed by said oscillator in response to changes in radiation impedance when an object is within the range of said detecting system to generate a control signal in response thereto.

2. The system as defined in claim 1 wherein said supply means comprises a constant current source including a feed transistor having a constant voltage applied to a base electrode thereof.

3. The system as defined in claim 1 wherein said oscillator includes a parallel inductor-capacitor circuit wherein said inductor is etched on a circuit board and said parallel capacitor is a variable capacitor positioned thereon.

4. The system as defined in claim 3 wherein said parallel inductor-capacitor circuit further includes a second variable capacitor coupled in circuit to reduce the physical length of said inductor.

5. The system as defined in claim 1 wherein said oscillator is a UHF oscillator adjustable over a range of 20 – 30 percent of the fundamental frequency thereof such that the zero axis of a radiated signal therefrom can be varied.

6. A system for detecting an object comprising:
   a UHF oscillator comprising an oscillator transistor having base, collector and emitter terminals with a L-C frequency determining circuit coupled between said base and collector, said L-C circuit comprising an inductor etched on a printed circuit board and at least one variable capacitor electrically coupled thereto and positioned thereon;
   constant current supply means including means for adjusting the current supplied therefrom to initiate oscillation of said oscillator;
   a high frequency choke coupling said current supply means to said oscillator transistor for providing operating energy for said oscillator;

a half wave dipole antenna coupled to said L-C circuit to radiate signals from said circuit and receive signals reflected from an object;

an amplifier having an input terminal direct current coupled to the junction of said current supply means and said high frequency choke for detecting signals thereat when an object is within range of said system and having output terminals for supplying amplified signals therefrom; and means coupled to said amplifier output terminals for providing control signals to utilization means.

7. The system as defined in claim 6 and further including oscillator temperature compensation means comprising a series resistance and transistor coupled from said L-C circuit to a reference potential.

* * * * *